(12) United States Patent
Urata et al.

(10) Patent No.: US 11,962,011 B2
(45) Date of Patent: Apr. 16, 2024

(54) NON-AQUEOUS ELECTROLYTE SECONDARY BATTERY

(71) Applicant: Panasonic Intellectual Property Management Co., Ltd., Osaka (JP)

(72) Inventors: Sho Urata, Tokushima (JP); Nobuhiro Sakitani, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 741 days.

(21) Appl. No.: 17/056,212

(22) PCT Filed: Apr. 26, 2019

(86) PCT No.: PCT/JP2019/017891
§ 371 (c)(1),
(2) Date: Nov. 17, 2020

(87) PCT Pub. No.: WO2019/230296
PCT Pub. Date: Dec. 5, 2019

(65) Prior Publication Data
US 2021/0313581 A1 Oct. 7, 2021

(30) Foreign Application Priority Data
May 30, 2018 (JP) .................................. 2018-103858

(51) Int. Cl.
*H01M 4/62* (2006.01)
*H01M 4/13* (2010.01)
(Continued)

(52) U.S. Cl.
CPC ............. *H01M 4/622* (2013.01); *H01M 4/13* (2013.01); *H01M 10/0525* (2013.01);
(Continued)

(58) Field of Classification Search
CPC ......... H01M 10/0525; H01M 10/0587; H01M 2004/021; H01M 2004/027;
(Continued)

(56) References Cited

U.S. PATENT DOCUMENTS

2008/0241646 A1* 10/2008 Sawa ................ H01M 10/0431
429/94
2010/0273052 A1 10/2010 Sakitani et al.
(Continued)

FOREIGN PATENT DOCUMENTS

| JP | 9-147834 A | 6/1997 |
|----|-----------|--------|
| JP | 10-270013 A | 10/1998 |

(Continued)

OTHER PUBLICATIONS

International Search Report dated Jul. 16, 2019, issued in counterpart application No. PCT/JP2019/017891 (2 pages).

*Primary Examiner* — Lingwen R Zeng
(74) *Attorney, Agent, or Firm* — WHDA, LLP

(57) ABSTRACT

A battery including a coiled electrode assembly with positive and negative electrodes coiled with a separator interposed therebetween, where the negative electrode includes a negative electrode current collector, a first negative electrode mixture layer formed on a first surface of the negative electrode current collector, the first surface facing an outside of the electrode assembly, and a second negative electrode mixture layer formed on a second surface of the negative electrode current collector, the second surface facing an inside of the electrode assembly. The first negative electrode mixture layer contains cellulose and rubber binders. A content of the cellulose binder is larger near a surface of the mixture layer than near the negative electrode current collector and a content of the rubber binder is larger near the negative electrode current collector than near the surface of (Continued)

the mixture layer in the thickness direction of the first negative electrode mixture layer.

6 Claims, 2 Drawing Sheets

(51) Int. Cl.
    *H01M 10/0525*     (2010.01)
    *H01M 10/0587*     (2010.01)
    *H01M 4/02*     (2006.01)
    *H01M 4/134*     (2010.01)

(52) U.S. Cl.
    CPC .. *H01M 10/0587* (2013.01); *H01M 2004/021* (2013.01); *H01M 2004/027* (2013.01); *H01M 4/134* (2013.01); *H01M 2300/0017* (2013.01); *Y02E 60/10* (2013.01); *Y02P 70/50* (2015.11)

(58) Field of Classification Search
    CPC ........... H01M 2300/0017; H01M 4/13; H01M 4/134; H01M 4/386; H01M 4/622; Y02E 60/10; Y02P 70/50
    See application file for complete search history.

(56) References Cited

U.S. PATENT DOCUMENTS

| | | |
|---|---|---|
| 2012/0009472 A1 | 1/2012 | Yokoi et al. |
| 2012/0115027 A1* | 5/2012 | Uchida ............... H01M 4/0404 427/58 |
| 2015/0263333 A1 | 9/2015 | Kinugawa et al. |
| 2017/0018779 A1 | 1/2017 | Umeyama et al. |

FOREIGN PATENT DOCUMENTS

| | | |
|---|---|---|
| JP | 2009-238720 A | 10/2009 |
| JP | 2012-022794 A | 2/2012 |
| JP | 2014-013697 A | 1/2014 |
| JP | 2014-120330 A | 6/2014 |
| JP | 2017-022018 A | 1/2017 |
| WO | 2014/068904 A1 | 5/2014 |

\* cited by examiner

NON-AQUEOUS ELECTROLYTE SECONDARY BATTERY

TECHNICAL FIELD

The present disclosure relates to a nonaqueous electrolyte secondary battery, and more specifically, to a nonaqueous electrolyte secondary battery including a coiled electrode assembly.

BACKGROUND ART

A negative electrode forming a nonaqueous electrolyte secondary battery generally includes a negative electrode current collector and a negative electrode mixture layer formed on both surfaces of the current collector. The negative electrode mixture layer contains a negative electrode active material and a binder, and with the binder binding the particles of the active material to one another and binding the active material and the current collector, the layer structure is retained. To date, nonaqueous electrolyte secondary batteries including a negative electrode in which the distribution of a binder in a negative electrode mixture layer is controlled to achieve a particular distribution to enhance battery performance such as in cycle characteristics have been known (e.g., see PTL 1 to 3).

CITATION LIST

Patent Literature

PTL 1: Japanese Published Unexamined Patent Application No. 9-147234
PTL 2: Japanese Published Unexamined Patent Application No. 10-270013
PTL 3: International Publication No. 2014/068904

SUMMARY OF INVENTION

Technical Problem

In a negative electrode mixture layer, when the binding force among the particles of an active material is weak, cracking in the mixture layer occurs, resulting in, for example, a deterioration of cycle characteristics due to poor conductivity. Particularly in a nonaqueous electrolyte secondary battery including a coiled electrode assembly, such cracking in a mixture layer is likely to occur in a portion of a negative electrode having a small radius of curvature, for example, a coiling-start-side end. Furthermore, a deterioration of cycle characteristics is also caused when the binding force between the active material and a current collector is weak. On the other hand, when the amount of a binder added is simply increased, a deterioration of capacity it caused. An object of the present disclosure is to improve cycle characteristics while retaining a high capacity in a nonaqueous electrolyte secondary battery including a coiled electrode assembly.

Solution to Problem

A nonaqueous electrolyte secondary battery according to one aspect of the present disclosure includes a coiled electrode assembly in which a positive electrode and a negative electrode are coiled with a separator interposed therebetween, where the negative electrode includes a negative electrode current collector, a first negative electrode mixture layer formed on a first surface of the negative electrode current collector, the first surface facing an outside of the electrode assembly and a second negative electrode mixture layer formed on a second surface of the negative electrode current collector, the second surface facing an inside of the electrode assembly, the first negative electrode mixture layer contains a cellulose binder formed of at least one of carboxymethyl cellulose and a salt thereof and a rubber binder formed of at least one of styrene-butadiene rubber and a modified form thereof, a content of the cellulose binder is, in a thickness direction of the first negative electrode mixture layer, larger near a surface of the mixture layer than near the negative electrode current collector, a content of the rubber binder is, in the thickness direction of the first negative electrode mixture layer, larger near the negative electrode current collector than near the surface of the mixture layer.

Advantageous Effects of Invention

According to one aspect of the present disclosure, cycle characteristics can be enhanced while retaining a high capacity in a nonaqueous electrolyte secondary battery including a coiled electrode assembly.

DESCRIPTION OF EMBODIMENTS

As a result of intensive studies in an effort to resolve the above-described problem, the inventors have found that, in the thickness direction of the first negative electrode mixture layer, by making the content of the cellulose binder larger near the surface of the mixture layer than near the negative electrode current collector and making the content of the rubber binder larger near the negative electrode current collector than near the surface of the mixture layer, for example, cracking in the mixture layer is prevented or reduced, thereby specifically improving the cycle characteristics of the battery. Hereafter, an example of an embodiment according to the present disclosure will be described in detail.

Hereafter, a cylindrical battery in which a coiled electrode assembly 14 is encased in a cylindrical battery housing 15 will be exemplified, but the battery housing is not limited to being cylindrical and may be, for example, rectangular, and may be a battery housing formed of a laminated sheet including a metal layer and a resin layer. The electrode assembly has a coiled structure and may be molded into a flat shape, but the structure of a negative electrode according to the present disclosure is particularly effective when the electrode assembly has a cylindrical coiled structure.

Figure 1:
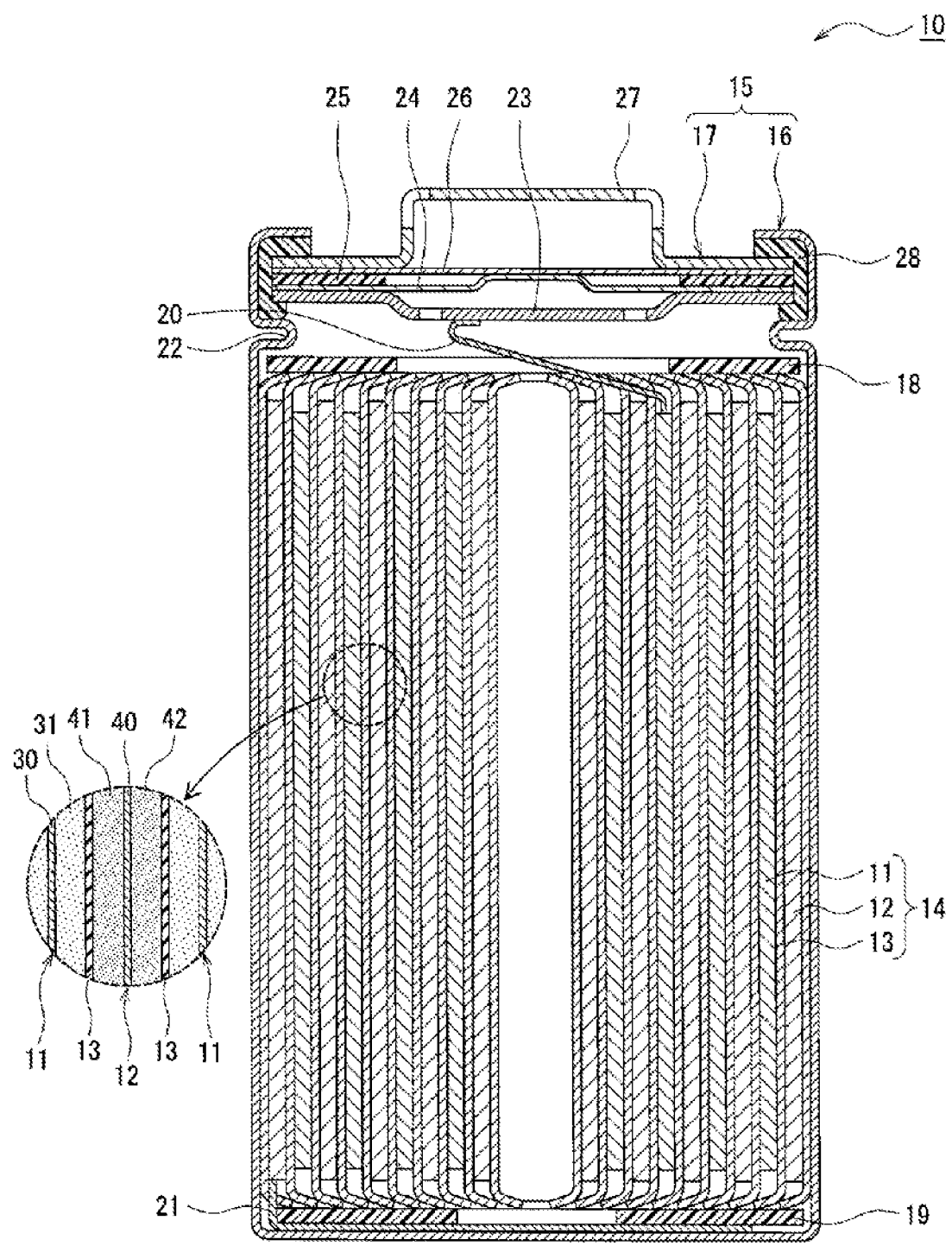
FIG. 1 is a sectional view of a nonaqueous electrolyte secondary battery in an example of an embodiment.

FIG. 1 is a sectional view of a nonaqueous electrolyte secondary battery 10 in an example of the present embodiment. As exemplified in FIG. 1, the nonaqueous electrolyte secondary battery 10 includes a coiled electrode assembly 14, a nonaqueous electrolyte (not illustrated), and a battery housing 15 encasing the electrode assembly 14 and the nonaqueous electrolyte. The coiled electrode assembly 14 has a coiled structure in which a positive electrode 11 and a negative electrode 12 are coiled with a separator 13 interposed therebetween. The battery housing 15 is formed of a bottomed cylindrical outer cover can 16 and a sealing body 17 blocking the opening of the outer cover can 16. Furthermore, the nonaqueous electrolyte secondary battery 10 includes a resin gasket 28 disposed between the outer cover can 16 and the sealing body 17.

The nonaqueous electrolyte contains a nonaqueous solvent and an electrolyte salt dissolved in the nonaqueous solvent. As the nonaqueous solvent, for example, an ester, an ether, a nitrile, an amide, or a mixed solvent of two or more kinds of the foregoing may be used. The nonaqueous solvent may contain a halogen substitute in which at least some of the hydrogens in these solvents are substituted with halogen atoms such as fluorine. The nonaqueous electrolyte is not limited to a liquid electrolyte and may be a solid electrolyte containing, for example, a gel polymer. As the electrolyte salt, for example, a lithium salt such as $LiPF_6$ is used.

The electrode assembly 14 is formed of a long positive electrode 11, a long negative electrode 12, two long separators 13, a positive electrode tab 20 jointed to the positive electrode 11, and a negative electrode tab 21 jointed to the negative electrode 12. The negative electrode 12 is formed in a size larger than the positive electrode 11 to keep lithium deposition from occurring. That is, the negative electrode 12 is formed longer than the positive electrode 11 in the longitudinal direction and in the width direction (lateral direction). The two separators 13 are formed a size larger than at least the positive electrode 11, and are disposed, for example, such that the positive electrode 11 is interposed between the separators 13.

An insulating plate 18 and an insulating plate 19 are disposed respective on top of and at the bottom of the electrode assembly 14. In the example of FIG. 1, the positive electrode tab 20 attached to the positive electrode 11 extends toward the sealing body 17 via a through hole of the insulating plate 18, and the negative electrode tab 21 attached to the negative electrode 12 extends toward the bottom of the outer cover can 16 via the outside of the insulating plate 19. The positive electrode tab 20 is connected to the lower surface of a bottom plate 23 of the sealing body 17 by way of, for example, welding, and a cap 27 serves as a positive electrode terminal, the cap 27 being electrically connected to the bottom plate 23 and being a top plate of the sealing body 17. The negative electrode tab 21 is connected to the inner surface of the bottom of the outer cover can 16, by way of, for example, welding, and the outer cover can 16 serves as a negative electrode terminal.

The outer cover can 16 is, for example, a bottomed cylindrical metal container. As described above, the gasket 28 is disposed between the outer cover can 16 and the sealing body 17, thereby sealing the inner space of the battery housing 15. The outer cover can 16 has a grooved portion 22 holding the sealing body 17, the grooved portion 22 being formed, for example, by pressing a side surface portion of the outer cover can 16 from the outside thereof. The grooved portion 22 is preferably formed in a ring shape in the circumferential direction of the outer cover can 16, and the sealing body 17 is held by the grooved portion 22 on the upper surface thereof. The upper end of the outer cover can 16 is folded inwards and is crimped with a peripheral portion of the sealing body 17.

The sealing body 17 has a structure in which, in order from near the electrode assembly 14, the bottom plate 23, a lower valve 24, an insulating member 25, an upper valve 26, and the cap 27 are layered. The members forming the sealing body 17 are disk- or ring-shaped, and the members other than the insulating member 25 are electrically connected with one another. The lower valve 24 and the upper valve 26 are connected in the central portion of the respective values and the insulating member 25 is interposed between the peripheral portions of the respective valves. When the internal pressure of the battery increased due to abnormal heat generation, the lower valve 24 is deformed such that the upper valve 26 is pushed up toward the cap 27, and the lower valve 24 is broken, thereby blocking the current path between the lower valve 24 and the upper valve 26. When the internal pressure is further increased, the upper valve 26 is broken, and gas is discharged from the the cap 27.

[Positive Electrode ]

The positive electrode 11 includes a positive electrode current collector 30 and a positive electrode mixture layer 31 formed on both surfaces of the positive electrode current collector 30. As the positive electrode current collector 30, for example, a foil of a metal that is stable in the potential range of the positive electrode 11, such as aluminum or an aluminum alloy, or a film wits such a metal disposed on the surface layer thereof can be used. The positive electrode mixture layer 31 contains a positive electrode active material, a conductive material, and a binder. The positive electrode 11 can be produced, for example, by coating the positive electrode current collector 30 with a positive electrode mixture slurry containing, for example, a positive electrode active material, a conductive material, and a binder, drying and thereafter compressing the resulting coating films, and thereby forming the positive electrode mixture layer 31 on both surfaces of the positive electrode current collector 30.

The positive electrode active material is formed of a lithium metal compos oxide serving as a main component. Examples of metal elements contained in the lithium metal composite oxide include Ni, Co, Mn, Al, B, Mg, Ti, V, Cr, Fe, Cu, Zn, Ga, Sr, Zr, Nb, In, Sn, Ta, and W. An example of a suitable lithium metal composite oxide is a composite oxide containing at least one kind of Ni, Co, Mn, and Al. To the particle surface of the above-described lithium metal composite oxide, for example, the particles of an inorganic compound such as an aluminum oxide or a lanthanoid-containing compound may adhere.

The conductive material contained in the positive electrode mixture layer 31 can be exemplified by a carbon material such as carbon black, acetylene black, Ketjen black, or graphite. The binder contained in the positive electrode mixture layer 31 can be exemplified by, for example, a fluorine resin such as polytetrafluoroethylene (PTFE) or polyvinylidene fluoride (PVdF), polyacrylonitrile (PAN), polyimide, an acrylic resin, or polyolefin. These resins may be used in combination with, for example, a cellulose derivative such as carboxymethyl cellulose (CMC) or a salt thereof or with polyethylene oxide (PEO).

[Negative Electrode]

Figure 2:
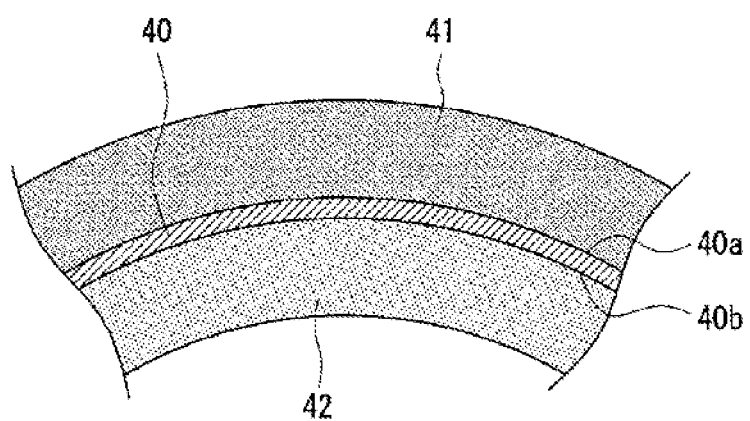
FIG. 2 is a sectional view of a negative electrode in an example of an embodiment.

FIG. 2 is a sectional view of the negative electrode 12. As exemplified in FIGS. 1 and 2, the negative electrode 12 includes a negative electrode current collector 40, a negative electrode mixture layer 41 (first negative electrode mixture layer) formed on a first surface 40a of the negative electrode current collector 40, the first surface 40a facing the outside of the electrode assembly 14, and a negative electrode mixture layer 42 (second negative electrode mixture layer) formed on a second surface 40b of the negative electrode current collector 40, the second surface 40b facing the inside of the electrode assembly 14. The positive electrode 11 has a layer structure in which the positive electrode mixture layer 31 having the binder uniformly distributed therein is formed on both surfaces of the positive electrode current collector 30. On the other hand, in the negative electrode 12, at least in the negative electrode mixture layer 41, the content of a binder varies continuously or in a stepped manner. As detailed later, the negative electrode mixture layer 41 contains a cellulose binder and a rubber binder, with the content of each binder being present in a gradient in the thickness direction of the mixture layer.

As the negative electrode current collector 40, for example, a foil of a metal that is stable in the potential range of the negative electrode 12, such as copper or a copper alloy, or a film with such a metal disposed on the surface layer thereof can be used. The negative electrode mixture layer 41 contains a negative electrode active material and binders. The negative electrode 12 can be produced, for example, by coating the negative electrode current collector 40 with a negative electrode mixture slurry containing, for example, a negative electrode active material and binders, drying and thereafter compressing the resulting coating films, and thereby forming the negative electrode mixture layer 41 on the first surface 40a of the negative electrode current collector 40 and forming the negative electrode mixture layer 42 on the second surface 40b of the negative electrode current collector 40. As detailed later, in the production of the negative electrode 12, two kinds of negative electrode mixture slurries, for example, differing in the content of the binders added, are used.

The negative electrode mixture layers 41 and 42 contain, as the negative electrode active material, for example, a carbon active material reversibly occluding and releasing lithium ions. Examples of suitable carbon active materials include graphites such as natural graphites, for example, flake graphite, massive graphite, and earthy graphite and artificial graphites, for example, massive artificial graphite (MAG) and graphitized mesophase carbon microbeads (MCMB). Furthermore, the negative electrode mixture layers 41 and 42 may contain, as the negative electrode active material, a Si active material formed of at least one of Si and a Si-containing material.

The content of the Si active material with respect to the total mass of the negative electrode active material is, for example, 1% to 15% by mass, preferably 3% to 10% by mass. An example of the Si active material is a Si-containing material represented by $SiO_x$. The Si-containing material is, for example, $SiO_x$ ($0.5 \le x \le 1.6$), wherein $SiO_y$ has a structure in which Si fine particles are dispersed in a $SiO_2$ matrix. The Si-containing material may be a material in which Si fine particles are dispersed in a lithium silicate ($Li_{2y}SiO_{(2+y)}$ ($0<y<2$)) phase (LSi). The negative electrode mixture layers may contain $SiO_x$ and LSi.

A conductive film formed of a material having higher conductivity than the Si active material is preferably formed on the particle surface of the Si active material. The material forming the conductive film can be exemplified by at least one kind selected from a carbon material, a metal, and a metal compound. Among these, a carbon material such as an amorphous carbon is preferable. A carbon film can be formed, for example, through a CVD method using, for example, acetylene and methane or through a method in which, for example, coal tar pitch, petroleum pitch, and a phenolic resin are mixed with the Si active material and thereafter heat treatment is performed. Furthermore, the conductive film may be formed by causing a conductive filler such as carbon black to adhere to the particles surface of the Si active material using a binder. The conductive film is formed, for example, in an amount of 0.5% to 10% by mass with respect to the mass of the Si active material.

As exemplified in FIG. 2, the negative electrode 12 forming the coiled electrode assembly 14 is curved throughout the length thereof in the longitudinal direction. The negative electrode 12 is manufactured in a flat-plate state and is curved by being coiled together with the positive electrode 11 and the separator 13 during the manufacture of the electrode assembly 14. The negative electrode 12 generally has a radius of curvature of about 1 mm to 10 mm, and the radius of curvature differs between the coiling-start side and the coiling-end side of the electrode assembly 14. The radius of curvature of the negative electrode 12 is represented by coiling-start-side end<coiling-end-side end. The minimum value of the radius of curvature of the negative electrode 12 is, for example, 1 mm to 5 mm or 1 mm to 2 mm.

Because of being manufactured in a flat-plate state, the negative electrode 12, when curved, the convex-surface side is extended and the concave-surface side is compressed. That is, the negative electrode mixture layer 41 formed on the first surface 40a of the negative electrode current collector 40, the first surface 40a facing the outside of the electrode assembly 14, is extended. On the other hand, the negative electrode mixture layer 42 formed on the second surface 40b of the negative electrode current collector 40, the second surface 40b facing the inside the electrode assembly 14, is compressed. Thus, cracking is more likely to occur in the negative electrode mixture layer 41 than in the negative electrode mixture layer 42. The inventors have succeeded in enhancing the cycle characteristics of the battery particularly by improving the layer structure of the negative electrode mixture layer 41.

The negative electrode mixture waver 41 contains a cellulose binder formed of at least one of carboxymethyl cellulose (CMC) and a salt thereof and a rubber binder formed of at least one of styrene-butadiene rubber (SBR) and a modified form thereof. In the thickness direction of the negative electrode mixture layer 41, the content of the cellulose binder is larger near the surface of the mixture layer than near the negative electrode current collector 40, and the content of the rubber binder is larger near the negative electrode current collector 40 than near the surface of the mixture layer. That is, in the thickness direction of the negative electrode mixture layer 41, the content of the cellulose binder is smaller near the negative electrode current collector 40, and the content of the rubber binder is smaller near the surface of the mixture layer.

The cellulose binder exhibits excellent properties of binding the particles of an active material to one another. On the other hand, the rubber binder exhibits excellent properties of binding the active material and a current collector. Thus, with a larger content of the cellulose binder in the vicinity of the surface of the negative electrode mixture layer 41 and with a larger content of the rubber binder in the vicinity of the negative electrode current collector 40, for example, the binding force among the particles of the active material is enhanced, thereby preventing or reducing the occurrence of cracking in the negative electrode mixture layer 41. Furthermore, the binding force between the active material and the current collector is enhanced, thereby preventing or reducing the occurrence of peeling in the negative electrode mixture layer 41. By improving the distribution of the two kinds of binders in the thickness direction of the negative electrode mixture layer 41, the binders can be efficiently used. Thus, the binding force in the negative electrode mixture layer 41 can be enhanced while suppressing the usage amount of the binders. As a result, cycle characteristics can be improved.

As the cellulose binder, for example, a salt, such as a sodium salt or an ammonium salt, of CMC in which the carboxyl groups of CMC are neutralized is used. Salts of CMC are, generally, partially neutralized salts in which some of the carboxyl groups are neutralized. As the cellulose binder, CMC may be used alone or a mixture of CMC and a salt of CMC may be used. As the rubber binder, SBR, a modified form of SBR, or a mixture of SBR and a modified form of SBR is used. The modified form of SBR preferably contains at least one selected from the group consisting of an acrylonitrile unit, an acrylate unit, an acrylic acid unit, a methacrylate unit, and a methacrylic acid unit.

The content of the cellulose binder, in the thickness direction of the negative electrode mixture layer 41, preferably increases continuously from near the negative electrode current collector 40 toward near the surface of the mixture layer. That is, no portion in which the content of the cellulose binder drastically varies is present, and the content of the cellulose binder gradually increases from near the negative electrode current collector 40 toward near the above-mentioned surface. In this case, the layer structure of the negative electrode mixture layer 41 is stabilized, and thus the usage efficiency of the binder is enhanced. Likewise, the content of the rubber binder, in the thickness direction of the negative electrode mixture layer 41, preferably increases continuously from near the surface of the mixture layer toward near the negative electrode current collector 40.

The negative electrode mixture layer 41 is formed by using, for example, two kinds of negative electrode mixture slurries differing in the amount of the binders added, and thus the negative electrode mixture layer 41 may have a multi-layer structure including a plurality of layers corresponding to the respective mixture slurries. In this case, in the thickness direction of the negative electrode mixture layer 41, a plurality of interfaces are present. On the other hand, even in the negative electrode mixture layer 41 formed by using two kinds of negative electrode mixture slurries, the content of the binders may vary continuously in the thickness direction, potentially resulting in the interfaces of the respective layers being unobservable. In this case, the negative electrode mixture layer 41 can be regarded as having a substantially single-layer structure.

When the negative electrode mixture layer 41 is divided in half at the center in the thickness direction thereof, the content of the binders differs between a portion positioned near the surface of the mixture layer (which may be hereafter referred to as a "50% region near the surface") and a portion positioned near the negative electrode current collector 40 (which may be hereafter referred to as a "50% region near the current collector"). Specifically, the content proportion of the cellulose binder present in the 50% region near the surface is preferably 51% by mass to 70% by mass, more preferably 51% by mass to 60% by mass with respect to the total mass of the cellulose binder contained throughout the negative electrode mixture layer 41. In this case, it becomes easier to use the cellulose binder efficiently and to thereby prevent or reduce the occurrence of cracking in the negative electrode mixture layer 41.

On the other hand, the content proportion of the rubber binder present in the 50% region near the current collector of the negative electrode mixture layer 41 is preferably 51% by mass to 70% by mass with respect to the total mass of the rubber binder contained throughout the negative electrode mixture layer 41. Furthermore, in the thickness direction of the negative electrode mixture layer 41, the content proportion of the rubber binder present in a portion included in a region of the mixture layer, the region corresponding to a region from an end near the negative electrode current collector 40 to 10% of the thickness of the mixture layer (which may be hereafter referred to as a "10% region near the current collector") is preferably 11% by mass to 30% by mass with respect to the total mass contained throughout the negative electrode mixture layer 41. By increasing the content proportion of the rubber binder in the 10% region near the current collector, it becomes easier to use the rubber binder efficiently and to thereby enhance the binding force between the active material and the current collector.

The content of the cellulose binder and the content of the rubber binder in the negative electrode mixture layer 41 with respect to the mass of the negative electrode active material are each preferably 0.1% by mass to 3.0% by mass, more preferably 0.5% by mass to. 1.5% by mass. In this case, it becomes easier to enhance cycle characteristics without affecting other battery performance. The distribution of the cellulose binder and the rubber binder can be measured through a method using a scanning electron microscope (SEM) described in Examples.

The negative electrode mixture layer 42 preferably contains the rubber binder in the same manner as with the negative electrode mixture layer 41. The content of the rubber binder is, in the thickness direction of the negative electrode mixture layer 42, larger near the negative electrode current collector 40 than near the surface of the mixture layer. With a larger content of the rubber binder in the vicinity of the negative electrode current collector 40, the binding force between the active material and the current collector can be enhanced. The negative electrode mixture layer 42 preferably contains the cellulose binder. The cellulose binder may be, in the thickness direction of the negative electrode mixture layer 42, present uniformly or may be present such that the content is larger near the surface of the mixture layer than near the negative electrode current collector 40. The negative electrode mixture layer 42 has, for example, the same layer structure as with the negative electrode mixture layer 41.

The negative electrode mixture layers 41 and 42 may differ from one another in thickness, but preferably are formed to have substantially the same thickness. The thickness of the negative electrode mixture layers 41 and 42 is, for example, 30 μm to 80 μm, preferably 40 μm to 60 μm. Other negative electrode active materials than a carbon active material and a Si active material may be further added to the negative electrode mixture layers 41 and 42. Such other negative electrode active materials can be exemplified by metals other than Si that are alloyed with lithium, compounds containing such metals, and lithium titanate.

The negative electrode mixture layer 41 is formed, for example, by coating the first surface 40a of the negative electrode current collector 40 with a first negative electrode mixture slurry and thereafter with a second negative electrode mixture slurry and subsequently by drying and compressing the resulting coating films. The negative electrode mixture slurries differ from one another in the content of the binders. The content of the cellulose binder is represented by first negative electrode mixture slurry<second negative electrode mixture slurry, and the content of the rubber binder is represented by first negative electrode mixture slurry>second negative electrode mixture slurry. During coating with the second negative electrode mixture slurry, the coating film formed by coating with the first negative electrode mixture slurry (first coating film) may be in a dried state, but is preferably in a non-dried state. Forming the second coating film by coating with the second negative electrode mixture slurry when the first coating film is in a non-dried state causes the binders to be diffused between the first coating film and the second coating film. As a result, the negative electrode mixture layer 41 in which the content of the binders varies continuously in the thickness direction is obtained. The negative electrode mixture layer 42, also, can be formed through the same method as with the negative electrode mixture layer 41 using the above-described two kinds of negative electrode mixture slurries.

[Separator]

As the separator 13, a porous sheet having ionic permeability and insulation properties is used. Specific examples of the porous sheet include microporous thin films, woven fabrics, and nonwoven fabrics. As the material of the separator 13, for example, an olefin resin, such as polyethylene or polypropylene, or a cellulose is suitable. The separator 13 may have a single-layer structure or a multi-layer structure. On the surface of the separator 13, for example, a heat resistant layer may be formed.

EXAMPLES

Hereafter, the present disclosure will be further described with reference to Examples, but these Examples are not intended to limit the present disclosure.

Example 1

[Production of Positive Electrode]

A lithium metal composite oxide represented by $LiNi_{0.38}Co_{0.09}Al_{0.03}O_2$, carbon black, and polyvinylidene fluoride were mixed in a mass ratio of 100:0.8:0.7, an appropriate amount of N-methyl-2-pyrrolidone was added thereto, and the resulting mixture was kneaded to thereby prepare a positive electrode mixture slurry. Both surfaces of a positive electrode current collector formed of an aluminum foil having a thickness of 15 μm were coated with the positive electrode mixture slurry. The resulting coating films were dried and thereafter rolled using a roller. The coating films were then cut in a predetermined electrode size to thereby produce a. positive electrode with a positive electrode mixture layer formed on both surfaces of the positive electrode current collector. The coating amount of the mixture slurry in total for both surfaces of the current collector was 560 g/m², and the rolling was performed using the roller such that the pole plate had a thickness of 161 μm.

[Preparation of First Negative Electrode Mixture Slurry]

A total of 95 parts by mass of graphite powder, 5 parts by mass of a Si-containing material containing a carbon film and represented by $SiO_x$ (x=1), and 0.8 parts by mass of a sodium salt of CMC were mixed, water was added to the mixture, and the resulting mixture was kneaded. Subsequently, a dispersion of SBR and an appropriate amount of water were added thereto to achieve a solid content of 1.2 parts by mass to thereby prepare a first negative electrode mixture slurry.

[Preparation of Second Negative Electrode Mixture Slurry]

The same procedure as with the first negative electrode mixture slurry was performed to prepare a second negative electrode mixture slurry except that the amount of the sodium salt of CMC added was changed to 1.2 parts by mass, and the amount of SBR added was changed to 0.8 parts by mass.

[Production of Negative Electrode]

Through a doctor blade method, one surface of a negative electrode current collector formed of a copper foil having a thickness of 8 μm was coated with the first negative electrode mixture slurry and thereafter further coated with the second negative electrode mixture slurry. Likewise, the other surface of the negative electrode current collector was coated with the first negative electrode mixture slurry and thereafter further coated with the second negative electrode mixture slurry. The coating amount was the same between the first and the second negative electrode mixture slurries and was 282 g/m² in total for both surfaces of the current collector. Subsequently, the resulting coating films were dried and thereafter rolled using the roller such that the electrode plate had a thickness of 138 μm. The coating films were then cut in a predetermined electrode size to thereby produce a negative electrode with a negative electrode mixture layer formed on both surfaces of the negative electrode current collector.

[Production of Electrode Assembly]

The positive electrode and the negative electrode were coiled onto a coiling core having a radius of curvature of 1.5 mm with a separator formed of a polyethylene microporous film having a thickness of 20 μm interposed therebetween, and a tape was stuck to the resulting outermost circumference surface to produce a cylindrical coiled electrode assembly. An aluminum positive electrode lead was welded to a current collector-exposed portion of the positive electrode, and a nickel negative electrode lead was welded to a current collector-exposed portion of the negative electrode.

[Preparation of Nonaqueous Electrolyte]

In a mixed solvent of ethylene carbonate, dimethyl carbonate, and ethyl methyl carbonate mixed in a mass ratio of 20:60:20, vinylene carbonate was dissolved in a concentration of 2% by mass. Subsequently, $LiPF_6$ was dissolved therein to achieve a concentration of 1.3 mol/L to thereby prepare a nonaqueous electrolyte.

[Production of Battery]

The electrode assembly was encased in a bottomed cylindrical outer cover can, and the positive electrode lead was welded to a sealing body and the negative electrode lead was welded to the inner bottom surface of the outer cover can. After the nonaqueous electrolyte was injected into the outer cover can, the opening of the outer cover can was sealed with the sealing body to thereby produce a nonaqueous electrolyte secondary battery (height: 65 mm, diameter: 18 mm, designed capacity: 3500 mAh).

[Evaluation of Cycle Characteristics (Capacity Retention Rate)]

The battery was charged/discharged under a temperature condition of 25° C. and under the following conditions to calculate the capacity retention rate.

<Charge/Discharge Conditions>

Charging: Constant-current charging was performed until the battery voltage reached 4.2 V at a current of 1050 mA. Furthermore, constant-voltage charging was performed until the current value reached 70 mA at a voltage of 4.2 V.

Discharging: Constant-current discharging was performed until the voltage reached 2.5 V at a constant current of 1750 mA.

The above-described charging/discharging was performed 100 cycles, and the capacity retention rate was calculated with the formula below. The results are presented in Table 1.

Capacity retention rate (%)=discharge capacity at 100th cycle/discharge capacity at 1st cycle×100

[Measurement CMC and SBR Contents]

The SBR and the CMC were dyed in different colors using two kinds of electronic dyeing agents, and a section of the negative electrode mixture layer was thereafter exposed through a cross-section polisher method. The section was observed with an SEM (JSM-6500F, manufactured by Japan Electron Optics Laboratory Co., Ltd., accelerating voltage: about 5 kV), and from the contrast in the obtained SEM images and in the reflected electron images thereof, the negative electrode active material, the SBR, and the CMC were identified to thereby analyze the distribution of the SBR and the CMC in the thickness direction of the mixture layer. To dye the SBR and the CMC in different colors, the SBR was dyed with osmium tetroxide ($OsO_4$) serving as an electronic dying agent, and the CMC was thereafter dyed with ruthenium tetroxide ($RuO_4$) serving as another electronic dying agent.

Comparative Example 1

The same procedure was performed as in Example 1 to produce a negative electrode and a nonaqueous electrolyte secondary battery except that the amount of the sodium salt of CMC added was changed to 1.0 part by mass and the amount of SBR added was changed to 1.2 parts by mass in the preparation of the first negative electrode mixture slurry and that the amount of the sodium salt of CMC added was changed to 1.0 part by mass and the amount of SBR added was changed to 0.8 parts by mass in the preparation of the second negative electrode mixture slurry. The above-described evaluation was then performed.

Comparative Example 2

The same procedure was performed as in Example 1 to produce a negative electrode and a nonaqueous electrolyte secondary battery except that the amount of the sodium salt of CMC added was changed to 1.2 parts by mass and the amount of SBR added was changed to 1.2 parts by mass in the preparation of the first negative electrode mixture slurry and that the amount of the sodium salt of CMC added was changed to 0.8 parts by mass and the amount of SBR added was changed to 0.8 parts by mass in the preparation of the second negative electrode mixture slurry. The above-described evaluation was then performed.

Comparative Example 3

The same procedure was performed as in Example 1 to produce a negative electrode and a nonaqueous electrolyte secondary battery except that the amount of the sodium salt of CMC added was changed to 0.8 parts by mass and the amount of SBR added was changed to 1.0 part by mass in the preparation of the first negative electrode mixture slurry and that the amount of the sodium salt of CMC added was changed to 1.2 parts by mass and the amount of SBR added was changed to 1.0 part by mass in the preparation of the second negative electrode mixture slurry. The above-described evaluation was then performed.

Comparative Example 4

The same procedure was performed as in Example 1 to produce a negative electrode and a nonaqueous electrolyte secondary battery except that the amount of the sodium salt of CMC added was changed to 1.0 part by mass and the amount of SBR added was changed to 1.0 part by mass in the preparation of the first negative electrode mixture slurry and that the amount of the sodium salt of CMC added was changed to 1.0 part by mass and the amount of SBR added was changed to 1.0 part by mass in the preparation of the second negative electrode mixture slurry. The above-described evaluation was then performed.

Comparative Example 5

The same procedure was performed as in Example 1 to produce a negative electrode and a nonaqueous electrolyte secondary battery except that the amount of the sodium salt of CMC added was changed to 1.2 parts by mass and the amount of SBR added was changed to 1.0 part by mass in the preparation of the first negative electrode mixture slurry and that the amount of the sodium salt of CMC added was changed to 0.8 parts by mass and the amount of SBR added was changed to 1.0 part by mass in the preparation of the second negative electrode mixture slurry. The above-described evaluation was then performed.

Comparative Example 5

The same procedure was performed as in Example 1 to produce a negative electrode and a nonaqueous electrolyte secondary battery except that the amount of the sodium salt of CMC added was changed to 0.8 parts by mass and the amount of SBR added was changed to 0.8 parts by mass in the preparation of the first negative electrode mixture slurry and that the amount of the sodium salt of CMC added was changed to 1.2 parts by mass and the amount of SBR added was changed to 1.2 parts by mass in the preparation of the second negative electrode mixture slurry. The above-described evaluation was then performed.

Comparative Example 7

The same procedure was performed as in Example 1 to produce a negative electrode and a nonaqueous electrolyte secondary battery except that the amount of the sodium salt of CMC added was changed to 1.0 part by mass and the amount of SBR added was changed to 0.8 parts by mass in the preparation of the first negative electrode mixture slurry and that the amount of the sodium salt of CMC added was changed to 1.0 part by mass and the amount of SBR added was changed to 1.2 parts by mass in the preparation of the second negative electrode mixture slurry. The above-described evaluation was then performed.

Comparative Example 8

The same procedure was performed as in Example 1 to produce a negative electrode and a nonaqueous electrolyte secondary battery except that the amount of the sodium salt of CMC added was changed to 1.2 parts by mass and the amount of SBR added was changed to 0.8 parts by mass in the preparation of the first negative electrode mixture slurry and that the amount of the sodium salt of CMC added was changed to 0.8 parts by mass and the amount of SBR added was changed to 1.2 parts by mass in the preparation of the second negative electrode mixture slurry. The above-described evaluation was then performed.

TABLE 1

| | Rubber binder 10% region near current collector | Cellulose binder 50% region near surface | Capacity retention rate |
|---|---|---|---|
| Example 1 | 20% by mass | 52% by mass | 86% |
| Comparative Example 1 | 20% by mass | 50% by mass | 82% |
| Comparative Example 2 | 20% by mass | 48% by mass | 80% |

TABLE 1-continued

|  | Rubber binder 10% region near current collector | Cellulose binder 50% region near surface | Capacity retention rate |
|---|---|---|---|
| Comparative Example 3 | 10% by mass | 52% by mass | 82% |
| Comparative Example 4 | 10% by mass | 50% by mass | 76% |
| Comparative Example 5 | 10% by mass | 48% by mass | 74% |
| Comparative Example 6 | 5% by mass | 52% by mass | 73% |
| Comparative Example 7 | 5% by mass | 50% by mass | 72% |
| Comparative Example 8 | 5% by mass | 48% by mass | 69% |

Table 1 presents, together with the capacity retention rate, the content proportion of the rubber binder and the content proportion of the cellulose binder in particular regions of the first negative electrode mixture layer. The content proportion of the rubber binder is, in the thickness direction of the first negative electrode mixture layer, the mass proportion of the rubber binder present in a portion included in a region of the mixture layer, the region corresponding to a region from an end near the negative electrode current collector to 10% of the thickness of the mixture layer, with respect to the total mass of the rubber binder contained throughout the mixture layer. The content proportion of the cellulose binder is, when the first negative electrode mixture layer is divided in half at the center in the thickness direction thereof, the mass proportion of the cellulose binder present in a portion positioned near the surface of the mixture layer with respect to the total mass of the cellulose binder contained throughout the mixture layer.

As presented in Table 1, the battery of Example 1 in which the content of the cellulose binder was made larger near the surface of the first negative electrode mixture layer and the content of the rubber binder was made larger in the vicinity of the current collector exhibits a high capacity retention rate and excellent cycle characteristics compared with the batteries of Comparative Examples. On the other hand, even when the content of the cellulose binder was large near the surface of the first negative electrode mixture layer, in the case where the content of the rubber binder was not large in the vicinity of the current collector (Comparative Examples 3, 6), the capacity retention rate was low in value. Even when the content of the rubber binder in the vicinity of the current collector was large, in the case where the content of the cellulose binder was not large near the surface of the first negative electrode mixture layer (Comparative Examples 1, 2), the capacity retention rate was low in value.

REFERENCE SIGNS LIST

10 nonaqueous electrolyte secondary battery, 11 positive electrode, 12 negative electrode, 13 separator, 14 electrode assembly, 15 battery housing, 16 outer cover can, 17 sealing body, 18, 19 insulating plate, 20 positive electrode tab, 21 negative electrode tab, 22 grooved portion, 23 bottom plate, 24 lower valve, 25 insulating member, 26 upper valve, 27 cap, 28 gasket, 30 positive electrode current collector, 31 positive electrode mixture layer, 40 negative electrode current collector, 40a first surface, 40b second surface, 41, 42 negative electrode mixture layer

The invention claimed is:

1. A nonaqueous electrolyte secondary battery comprising a coiled electrode assembly in which a positive electrode and a negative electrode are coiled with a separator interposed therebetween,
wherein the negative electrode includes a negative electrode current collector, a first negative electrode mixture layer formed on a first surface of the negative electrode current collector, the first surface facing an outside of the electrode assembly, and a second negative electrode mixture layer formed on a second surface of the negative electrode current collector, the second surface facing an inside of the electrode assembly,
the first negative electrode mixture layer contains a cellulose binder formed of at least one of carboxymethyl cellulose and a salt thereof and a rubber binder formed of at least one of styrene-butadiene rubber and a modified form thereof,
a content of the cellulose binder is, in a thickness direction of the first negative electrode mixture layer, larger near a surface of the mixture layer than near the negative electrode current collector,
a content of the rubber binder is, in the thickness direction of the first negative electrode mixture layer, larger near the negative electrode current collector than near the surface of the mixture layer, and
when the first negative electrode mixture layer is divided in half at a center in the thickness direction thereof, a content proportion of the cellulose binder present in a portion positioned near the surface of the mixture layer is 51% by mass to 70% by mass with respect to a total mass of the cellulose binder contained throughout the mixture layer.

2. The nonaqueous electrolyte secondary battery according to claim 1,
wherein the second negative electrode mixture layer contains the rubber binder, and
the content of the rubber binder is, in a thickness direction of the second negative electrode mixture layer, larger near the negative electrode current collector than near a surface of the mixture layer.

3. The nonaqueous electrolyte secondary battery according to claim 1,
wherein the content of the cellulose binder, in the thickness direction of the first negative electrode mixture layer, increases continuously from near the negative electrode current collector toward near the surface of the mixture layer, and
the content of the rubber binder, in the thickness direction of the first negative electrode mixture layer, increases continuously from near the surface of the mixture layer toward near the negative electrode current collector.

4. The nonaqueous electrolyte secondary battery according to claim 1, wherein, in the thickness direction of the first negative electrode mixture layer, a content proportion of the rubber binder present in a portion included in a region of the mixture layer, the region corresponding to a region from an end near the negative electrode current collector to 10% of a thickness of the mixture layer, is 11% by mass to 30% by mass with respect to a total mass of the rubber binder contained throughout the mixture layer.

5. The nonaqueous electrolyte secondary battery according to claim 1,
wherein a minimum value of a radius of curvature of the negative electrode is 1 mm to 5 mm.

6. The nonaqueous electrolyte secondary battery according to claim 1,
wherein the first negative electrode mixture layer has a multi-layer structure including a plurality of layers and one or more interfaces therebetween in the thickness direction.

* * * * *